United States Patent Office 3,595,811
Patented July 27, 1971

3,595,811
METHOD OF PREPARING POLYPHENYLENE POLYMERS
Norman Bilow, Los Angeles, Calif., assignor to Hughes Aircraft Company, Culver City, Calif.
No Drawing. Filed Sept. 5, 1967, Ser. No. 665,308
Int. Cl. C08g 33/00
U.S. Cl. 260—2                                                   9 Claims

ABSTRACT OF THE DISCLOSURE

Method of providing improvement in the manufacture of commercially useful polyphenylene polymers by the polymerization of meta-terphenyl, ortho-terphenyl, biphenyl, quaterphenys other than para quaterphenyl, and mixtures of the same, including mixtures of such compounds with other phenylene oligomers or polyphenyls with from 1 to 5 aromatic rings and the discovery of the use of excess strong Lewis acid polymerization catalyst to oxidant and monomer to effect a viscosity change, improving polymerization conditions and amazingly provided improved yield, better homogeneity and reducing the reaction temperature, and the improved polyphenylene products produced thereby.

This disclosure relates to the discovery of an improvement on the subject matter of copending application Ser. No. 349,770, filed Mar. 5, 1964 (now abandoned), and the related subject matters of the herewith filed applications, I am filing with Leroy J. Miller, entitled "Commercially Useful Polyphenylene Polymers and Method of Production Thereof," Ser. No. 665,262, "Method of Providing Useful Heat-Setting Aromatic Polymer Resinous Compositions and Products," Ser. No. 665,578, and "Aromatic Resinous Curing System and Method," Ser. No. 665,303, likewise assigned to the present assignee Hughes Aircraft Company.

More particularly, the improvement lies in the discovery of a critical method of facilitating the manufacture and improving the yields of usable, soluble and fusible branched unalkylated polyphenylene resin solids obtained in the polymerization of ortho-terphenyl, meta-terphenyl, biphenyl, quaterphenyls other than para-quaterphenyl, and mixtures thereof, and mixtures of such compounds with other aromatic monomers or phenylene oligomers or polyphenyls with no more than five and preferably less than five aromatic rings, by a combined catalytic and oxidative process therefor, and the product obtained thereby having a carbon to hydrogen atom ratio in excess of 1.3 and on the order of 1.5 being in the range of 1.4 to 1.7.

As disclosed in the above application, a commercially feasible process is revealed. However, in utilizing the required molar portions of catalyst, or aluminum chloride, bromide or iodide and mixtures thereof, the polymerization reaction develops rapidly and oftentimes causes breakage of equipment or slows and stops the reaction resulting in reduced yields. The addition of more solvent material and more heat did not solve the problem and it was accidentally discovered that an excess of the molar proportion of the catalyst, aluminum chloride, based on the stoichiometric proportion of the oxidant cupric chloride, has a profound effect upon the viscosity of the reaction mixture during polymerization.

Accordingly, it is the essential object of this disclosure to provide an improved critical method of controlling the viscosity of the particular polymerization reaction, facilitating manufacture and improving the yields of fusible, and tractable, polyphenylene resins, as defined; which can be cross-linked, cured, or vulcanized, and the like, in fabricating and for prefabrication of useful articles.

It is another object of this disclosure to provide an improvement in the method of effecting and controlling the viscosity of the particular polymerization reaction conditions to effect a resulting polyphenylene polymer, from the monomer material defined, that can be isolated and processed with greater ease and in an improved usable condition.

Additional objects and advantages will be apparent from the following description illustrating non-limiting examples of the improvements herein provided.

For many applications in the art of molding and fabricating structures having high thermal stability, it is essential to use a high-temperature-stable polymer which has an intrinsically high molecular weight or which may be cross-linked, cured, vulcanized, and the like, to produce a high molecular weight (or an infinite molecular weight), during the said molding and fabrication process. At the same time, it is essential that the polymer be fusible or capable of flow under the conditions of heat and pressure that are used in the said molding and fabrication process and that the uncured polymer be soluble in suitable solvents so that fillers, fibers, and the like, can be intimately mixed, coated and impregnated with the polymer prior to the said molding and fabrication process.

The exceptional characteristics of the branched polyphenylene resins of the present invention may be described in terms of five outstanding properties:
(1) They have excellent thermal stability when cured exhibiting negligible weight loss between 400°–500° C. in an inert atmosphere;
(2) They have mean molecular weights which range from 1000±500 up to about 4000;
(3) They are sufficiently soluble in one or more organic solvents such as the mono-, di-, and trihalobenzenes, tetrachloroethane, chloroform, and toluene, especially when heated to permit their use in lacquers and varnishes;
(4) They are fusible solids and flow sufficiently at temperatures that are conventionally employed in hot molding presses to permit their fabrication in conventionally available equipment.
(5) They have a carbon to hydrogen atomic ratio between 1.45 and 1.7 which compares very favorably to the theoretical value of 1.5 and which demonstrates the essentially fully aromatic non-reduced nature of the polymers.

This unique combination of properties coupled with their ease of preparation in good yield by the process of the present invention, constitutes a significant and major advance in the state of the art of providing commercially usable fully aromatic polyphenylene resins. This unique combination of properties is the direct result of the proper choice, and proportion of reactants and of the proper choice and use of the catalyst and oxidant in the process of the present invention. In the copending disclosure are described unique composite resin combinations and compositions which utilize the branched polyphenylene resins of the present invention in curable, or vulcanizable compositions which can be fabricated into useful molded and laminated structures. Structures produced in this manner include: electrical insulators, rocket nozzles, and structural materials, which are required to withstand high temperatures, or substantially high temperatures for long periods of time.

In the process of the present invention, the aromatic reactants may be ortho-terphenyl, meta-terphenyl, biphenyl, quaterphenyls other than para-quaterphenyl, and mixtures of these compounds, including mixtures of such compounds with other aromatic monomers, polyphenyls or phenylene oligomers with not more than and preferably less than five aromatic rings. In the case of terphenyl, its isomers and mixtures thereof can be employed in the process of this invention. In the case of quaterphenyl, its isomers and mixtures thereof are suitable for this invention. Any single compound or isomer is satisfactory for producing the branched polyphenylene resins of this invention, and any mixture of those compounds and their isomers are also suitable. However, some compounds and isomers or mixtures of compounds and isomers are more convenient than others. The relative convenience is dictated by such considerations as steric configuration, cost, solubility, melting point and ease of processing during the course of the polymerization reaction, and yields.

More particularly the preferred polyphenylenes are polymers of monomers selected from the group consisting of biphenyl, ortho- and meta-terphenyls, the 2,2'-, 3,3'-, 2,3'-, 2,4'-, 3,4'-, diphenyl biphenyls, the 1,2,3-, 1,2,4-, and 1,3,5-triphenylbenzenes, mixtures thereof, and mixtures thereof with other aromatic monomers or phenylene oligomers and polyphenyls with not more than five aromatic rings. Less preferably, but, if desired, a small amount of benzene up to about ⅓ by weight may be used with the above. If too much benzene is used, an intractable material is obtained. The para terphenyl and quaterphenyl are not adaptable to being polymerized alone for producing the most desirable fusible and tractable polyphenylene polymers, but less perferably may be present in trace to limited amounts in the monomer mixture, or present in a polymer mixture with the above polymerized monomers, as a combination mixture, with retention of the desirable polymers in predominately tractable, fusible and curable form.

The catalyst and oxidant employed in the process of the present invention is very critical. As the catalyst, a strong Lewis acid is used. The strong Lewis acid compound is an actual catalyst; that is, it may be employed in amounts less than that which the stoichiometry of the reaction calls for. However, the use of greater than catalytic quantities is preferred for accomplishing the improvements herein provided. The Lewis acid catalyst must be one that is classed as a strong Lewis acid. As the strength of the Lewis acid falls off from the strongest available, then the reaction rate of the process of the present invention falls off sharply. It is, therefore, essential and preferred to employ a critical amount, greater than molar excess, of such Lewis acids as the aluminum halides, including aluminum chloride, aluminum bromide and aluminum iodide and mixtures of the same. Less preferably, other such catalysts as tantalum pentachloride, ferric chloride, antimony pentachloride, gallium tribromide, zirconium tetrachloride, mixtures of the same, and mixtures with the above may be used in the herein described relationship relative to the molar portion of polyphenylene forming reactants. The oxidant employed in the process of the present invention must be employed in stoichiometric quantities because it is essentially a reactant which oxidizes the partially aliphatic polymer which is formed as an intermediate to a fully aromatic polymer. Therefore, at least that molar quantity necessary to fully aromatize the polymer is required to be present as a reactant during the reaction.

For each mole of aromatic compound in the reaction, there is normally required two molar equivalents of the oxidant because for each mole of aromatic monomer that reacts, two electrons must be removed, thus, reducing two molar equivalents of the oxidant. One of the most efficient oxidants for this process is cupric chloride ($CuCl_2$). In using this oxidant, hydrogen chloride is evolved as a byproduct and the cupric chloride is reduced to cuprous chloride which is inactive as an oxidant. Thus one mole is one molar equivalent with one electron change. Oxidants which provide two equivalents per mole or more may also be utilized. Other oxidants which may also be employed include cupric bromide and mixtures of suitable oxidant material, including oxygen, as disclosed in the herewith filed application entitled "Fusible, Soluble Aromatic Polymers and Process of Making Same," Ser. No. 665,265, of Norman Bilow, John B. Rust, and Abraham L. Landis.

It has now been unexpectedly discovered that the molar proportion of Lewis acid catalyst (preferably aluminum chloride) based on the proportion of the cupric chloride oxidant has a surprisingly profound effect upon the viscosity of the reaction mixture during polymerization. Viscosity of the reaction mixture during polymerization is a major factor in the control of the reaction and in the production of a more uniform product in increased yields. Viscosity affects the power consumption needed to efficiently stir and mix the reaction ingredients which in turn affects the efficiency of mixing. The efficiency of mixing affects the over-all yield, the time of reaction at a given temperature and the relative proportions of unreacted material, of usable polymer, and of intractable very high molecular weight polymer. The viscosity of the reaction mixture also controls the liberation of by-product hydrogen chloride and the manner in which it is released, i.e., the amount and character of foaming which accompanies the release of the hydrogen chloride and the ease to which the foam which is formed may be broken down. As a consequence, any means of controlling the viscosity of the reaction mixture is of great technical importance in the preparation of fully aromatic branched polyphenylenes.

The following are non-limiting examples illustrating compositions of monomer material, as indicated, and the process of polymerization thereof with a strong Lewis acid catalyst and oxidant combination including the method therefor and products obtained therefrom. Additional objects and advantages will be recognized from the disclosure herein. Accordingly, to the accomplishment of the foregoing and related ends, this improvement then comprises the features herein pointed out and inherent therewith, and as particularly pointed out in the claims. The illustrative embodiments being indicative of the various ways in which the principle of the present disclosure may be employed.

EXAMPLE I

The following were run simultaneously, using in each the same amounts of biphenyl, m-terphenyl and cupric chloride. Each example was conducted by heating the mixture of biphenyl and m-terphenyl to 100° C. in a common oil bath, adding the aluminum chloride to the molten monomers, followed by the slow addition, over a period of about 1½ hours at 100° C., of the cupric chloride. After the cupric chloride had been added, the reaction mixture in each case was stirred mechanically for three hours at 100° C.

A very profound difference in viscosity was noted in each example after the complete addition of the cupric chloride and after the reaction was essentially complete. At the end of the reaction period, the temperature of the oil bath was raised to 120° C. and the viscosity of each batch was measured with a Brookfield viscosimeter. The following table summarizes the results of this series of examples.

| Batch | Biphenyl, grams | m-terphenyl, grams | AlCl₃, grams | CuCl₂, grams | Viscosity at 120° C. in centipoises | Yield,[1] percent |
|---|---|---|---|---|---|---|
| 1 | 20 (0.13 mole) | 30 (0.13 mole) | 13.3 (0.10 mole) | 53.6 (0.4 mole) | Solid, crumbly material thru reaction. | 28 |
| 2 | | | 26.6 (0.20 mole) | | 2,000,000–3,000,000 | 46 |
| 3 | | | 53.6 (0.40 mole) | | 450,000 | 70 |
| 4 | | | 106.4 (0.80 mole) | | 150,000 | 40 |

[1] Yield specified is the relative yield of the polymer fraction which is most suitable for use in formulating thermosetting polymer lacquers. Yield shown is percent conversion based on CuCl₂. The yields represent the "useful" polymer fraction as defined by certain solubility characteristics; namely, non-extractability with a mixture of boiling benzene (10%) in hexane (90%) but extractable with a proper solvent as hot to boiling chlorobenzene or other suitable solvent, as indicated.

It is apparent from these results that proportion of aluminum chloride has a very large effect upon melt viscosity of the particular reaction mixture. Example I–1 represents a condition where satisfactory mixing was not possible and it is doubtful that a sigma blade-type mixer could handle the material. On the other hand, the reaction mixtures of Example I–3 and Example I–4 were fluid and could be stirred with ease in an efficient manner with very little expenditure in power for mixing.

EXAMPLE II

Several additional examples, prepared in the above manner, are provided for this disclosure of discovery and improvement. These include:

| Experiment | Biphenyl | | m-Terphenyl | | CuCl₂ | | AlCl₃ | | "Useful" polymer,[1] percent | Total yield of polymers, percent | "Useful" polymer melting range | Viscosity, centipoises |
|---|---|---|---|---|---|---|---|---|---|---|---|---|
| | Grams | Mole | Grams | Mole | Grams | Mole | Grams | Mole | | | | |
| 1 | 20 | 0.13 | 30 | 0.13 | 53.6 | 0.40 | 53.2 | 0.40 | 61 | 70 | 135–176 | 158,000 |
| 2 | 62 | 0.40 | | | 107 | 0.80 | 107 | 0.80 | 52 | 83 | 132–177 | 447,000 |
| 3 | | | 92 | 0.40 | 107 | 0.80 | 107 | 0.80 | 49 | 83 | 126–174 | 343,000 |

[1] Yields expressed represent percent conversion based upon CuCl₂ as the limiting reagent. Furthermore, these yields represent the "useful" polymer fraction as defined by certain solubility characteristics; namely, non-extractability with a mixture of boiling benzene (10%) in hexane (90%) but extractable with chlorobezene at its normal boiling point.

EXAMPLE III

Ortho-terphenyl (46.0 g., 0.2 mole)
Biphenyl (30.8 g., 0.2 mole)
Cupric chloride (dry, 108.0 g., 0.8 mole)

The above ingredients were mixed and heated to 135° C. with stirring. During the first hour 145 g. (1.1 mole) of aluminum chloride was added in small portions and the temperature was allowed to rise to 165° C. Heating continued for 3¼ hours additional while the temperature varied between 158° and 180° C. The hot product was treated with dilute hydrochloric acid (6 N) several times, then with water. After drying, the polymer was extracted with cyclohexane in a continuous extraction (43 hours) and this procedure removed 30 percent of the product (low molecular weight). The remaining portion was then extracted continuously with hot toluene. The portion of the polyphenylene which was recovered from the third and fourth days extraction melted from 180°–220° C. and when analyzed by tremogravimetric analysis (in N₂, 360° C./hr. rate of temperature increase), showed 3% wt. loss at 752° F. (400° C.)
6% wt. loss at 932° F. (500° C.)
10% wt. loss at 1112° F. (600° C.)
20% wt. loss at 1292° F. (700° C.)

EXAMPLE IV

Meta-terphenyl (46.0 g., 0.2 mole)
Biphenyl (30.8 g., 0.2 mole)
Cupric chloride (108.0 g., 0.8 mole)

The above mixture was heated at 140° C. While stirring continuously, aluminum chloride (145 g., 1.1 mole) was added in small portions over a one-hour period. Heating was then continued for 3½ hours with the temperature varying from 154–175° C.

The product was purified by several washings with dilute hydrochloric acid (6 N), and then water and dried After extracting the dried product continuously with hot cyclohexane for 18 hours, the product was then extracted continuously with hot toluene. That portion of the polymer which was obtained on the third and fourth days of the toluene extraction process melted at 190–210° C. It also had outstanding thermal stability as indicated by thermogravimetric analysis (in N₂, 360° C./hr. rate of temperature increase). This specimen showed 1% weight loss at 752° F. (400° C.)
3% weight loss at 932° F. (500° C.)
6% weight loss at 1112° F. (600° C.)
15% weight loss at 1292° F. (700° C.)

While the above Examples III and IV are exemplary of production of polyphenylenes with use of a molar excess of catalyst, the important factor is that upon the discovery of the possibility of controlling viscosity by addition of a molar excess of the catalyst, the temperature of reaction could be reduced about 30 to 50° C. with improved yield and better homogeneity.

The polyphenylene polymers, as produced above are soluble and fusibile. They are soluble for example in the solvents as indicated and copolymerizable with a curing agent material to form coating and laminating resinous compositions or otherwise may be mixed in the dry state with a curing agent and copolymerized therewith forming a plastic thermosetting resin, as described in the above and herewith filed copending applications, entitled "Method of Providing Useful Heat-setting Aromatic Polymer Resinous Compositions and Products," Ser. No. 665,578, and "Aromatic Resinous Curing System and Method," Ser. No. 665,303, included herein by reference thereto.

Having described and illustrated the present embodiment of this improvement in the art in accordance with the patent statutes, it will be apparent that some modification and variation may be made without departing from the spirit and scope thereof. The specific embodiments described are given by way of examples illustrative of the improvements discovered applicable herein.

What is claimed is:

1. A process of producing a heat curable, essentially soluble and fusible polyphenylene polymer having a carbon to hydrogen ratio in the range of 1.4 to 1.7 and a molecular weight range from 1,000±500 to about 4,000 comprising the steps of:

(1) forming a reaction mixture of:
  (a) aromatic hydrocarbon monomer material selected from the group consisting of biphenyl, ortho-terphenyl, meta-terphenyl, a quaterphenyl other than para-quaterphenyl alone, mixtures thereof and mixtures with other polyphenyls with not more than five aromatic rings;

(b) a strong Lewis acid polymerization catalyst in a stoichiometric amount exceeding the molar portion of said monomer material; and (c) an oxidant in an amount sufficient to aromatize said monomer material during formation of said polymer;

(2) heating said reaction mixture to a temperature of 100° C. to 180° C. for a period of about 1 hour to about 3 hours; and (3) recovering said essentially soluble and fusible polyphenylene polymer.

2. A process according to claim 1 in which said aromatic hydrocarbon monomer material includes benzene in a proportion of not more than about ⅓ by weight of said material.

3. A process according to claim 1 in which the oxidant is selected from the group consisting of cupric chloride, cupric bromide, ferric chloride, oxygen gas and mixtures thereof.

4. The method of claim 1, wherein the monomers are selected from the group consisting of biphenyl, ortho- and meta-terphenyls, the 2,2'-, 3,3'-, 2,3', 2,4'-, 3,4'-, diphenyl biphenyls, the 1,2,3-, 1,2,4-, and 1,3,5-triphenyl benzenes, mixtures thereof, and mixtures thereof with other aromatic monomers with not more than five aromatic rings, including mixtures of said monomers with benzene in an amount of not over about one third by weight of said mixture.

5. The process of claim 1 wherein the said aromatic hydrocarbon monomer material in the said mixture is selected from the group consisting of biphenyl, ortho-terphenyl, meta-terphenyl, quaterphenyls, other than para-quaterphenyl alone, mixtures of such compounds and mixtures of same with polyphenyls with less than five aromatic rings, and said aromatic hydrocarbon monomers are present in a relative molar amount less than the molar portion of said catalyst and heat of mixture preparation and reaction is on the order of 100° C. to about 175° C.

6. The process of claim 1 wherein the catalyst is selected from the group consisting of aluminum chloride, aluminum bromide, aluminum, iodide, tantalum pentachloride, ferric chloride, antimony pentachloride, gallium tribromide, zirconium tetrachloride, and mixtures of the same.

7. The process of claim 1 wherein the catalyst is aluminum chloride and the oxidant is cupric chloride and the catalyst is present in a greater than molar excess than the molar ratio of said monomers.

8. The process of claim 1 wherein the said aromatic hydrocarbon reactant in the said combination is selected from the group consisting of biphenyl, ortho-terphenyl, meta-terphenyl, quaterphenyls, other than para-quaterphenyl as the sole constituent, mixtures of such compounds and mixtures of same with polyphenyls with no more than five aromatic rings, and said catalyst is present in a relative molar amount in excess of said aromatic hydrocarbon monomers and equivalent to or greater than the molar portion of said oxidant.

9. The process of claim 1 wherein the said aromatic hydrocarbon reactant in the said combination is selected from the group consisting of biphenyl, ortho-terphenyl, meta-terphenyl, quaterphenyl other than para-quaterphenyl alone, mixtures of such compounds and mixtures of same with polyphenyls with less than five aromatic rings, and said aromatic hydrocarbon reactant is present in a relative molar amount less than the molar portion of said catalyst n dthe oxidant is present in a relative amount equal to at least about two electron equivalents of oxidant per mole of monomer.

References Cited

UNITED STATES PATENTS

| 3,159,589 | 12/1964 | Bloomfield et al. | 260—2 |
| 3,431,221 | 3/1969 | Hoess | 260—2 |

FOREIGN PATENTS

| 1,000,679 | 8/1965 | Great Britain | 260—2 |

OTHER REFERENCES

Bilow et al.: "Jour. Macromol. Science (Chem.)," vol. Al (1), Mar. 29, 1967, pp. 183–197.

SAMUEL H. BLECH, Primary Examiner

U.S. Cl. X.R.

117—161; 260—33.6; 33.8